United States Patent Office 3,429,716
Patented Feb. 25, 1969

3,429,716
OXIDATION RESISTANT COMPOSITIONS FOR
HUMAN CONSUMPTION
Frederick A. Andrews, Minneapolis, Minn.
No Drawing. Continuation-in-part of application Ser. No. 345,081, Feb. 17, 1964. This application May 10, 1967, Ser. No. 637,372
U.S. Cl. 99—150                    9 Claims
Int. Cl. A23l 3/00; A23d 5/04; C11b 5/00

ABSTRACT OF THE DISCLOSURE

A technique for retarding oxidation and deterioration of compositions for human consumption or the like, the technique including the addition of a stabilizing composition to materials being preserved, the stabilizing composition being a cis type sugar of the pyranose or furanose type wherein the hydroxyl groups of the 2 and 3 positions are disposed outwardly on the same side of the ring.

---

The present application is a continuation-in-part of my copending application Ser. No. 345,081 filed Feb. 17, 1964 now abandoned.

The present invention relates to the treatment of materials for human consumption, particularly for stabilizing such materials against the deleterious effects of oxygen, and more particularly to a technique for stabilizing anhydrous or substantially anhydrous materials of this type. The technique of the present invention in addition to stabilizing the materials, thereby improves the flavor retention capability and otherwise renders it more desirable for a product to be sold for ultimate human consumption. As indicated, the technique of the present invention finds particular utility in preserving anhydrous or substantially anhydrous commodities or systems. The technique of the present invention increases the keeping qualities of food substances, especially those intended for long-term storage after dehydration, or whose normal state is essentially anhydrous or non-aqueous, such as, for example, potato chips, cookies, crackers, meat, or chewing gum.

It is therefore an object of the present invention to provide an improved technique for enhancing the ability of non-aqueous food materials to resist oxidation or deterioration during storage and prior to consumption.

It is yet a further object of the present invention to provide a technique and system to prevent the interaction between lipids (fats) and proteins during storage and prior to consumption, thereby stabilizing, and otherwise retaining the original taste and flavor of such food products.

Other and further objects of the present invention will become apparent from the following specification and appended claims.

In accordance with the preferred embodiment of the present invention, I add to the material to be protected from oxidation a quantity equivalent to at least 0.0005 percent, and preferably about 0.001 percent by weight on a dry basis, of a monosaccharide having a structural formula in which those two hydroxyl groups on those two carbon atoms following the carbonyl group, are on the same side of the molecule. These materials are known as compounds having the hydroxyl groups in the cis position on the 2,3 carbons. It has been further determined that those substances having hydroxyl groups in the cis position on the 2,3 carbons wherein these hydroxyl groups extend outwardly of the molecular structure are of greater efficacy. Examples of such substances are, for example, the tetrose d-erythrose, the pentose d-ribose, the hexoses d-allose and d-gulose. It will be appreciated that each of the above referenced substances has a structural formula in which the 2,3 cis hydroxyl groups extend outwardly of the ring structure.

The invention may be illustrated by reference to the following examples:

EXAMPLE I

A mixture containing 80 percent by weight of citronella oil in 20 percent by weight of sulfated castor oil was prepared and divided into two equal parts. To one 100 gram aliquot was added 50 mg. of d-ribose with stirring. To the other aliquot was added 50 mg. of d-arabinose with stirring. These samples were then irradiated with ultraviolet light of moderate intensity for one hour. The samples were then left at room temperature and tested for smell periodically. The oil containing ribose continued to have a fresher odor with less terpene inversion than the sample containing the inactive arabinose. The conclusion reached was that the ribose functioned as a primary antioxidant rather than as a pro-oxidant or chelator for trace metals which may be present in the system.

EXAMPLE II

A fresh potato was cut in two halves. To one half was added 0.05 percent by weight of d-erythrose, and to the other half was added 0.05 percent by weight of d-xylose. The raw potato was chopped in a blender, dried by being passed through a freeze-dry cycle, and thereafter permitted to be exposed to ordinary ambient air. After 24 hours of exposure, it was observed that there was significantly less darkening on the sample treated with the erythrose than there was on the half containing xylose.

EXAMPLE III

A slice of U.S. Choice prime beef was dipped in a one percent solution of d-erythrose, and was then freeze dried. Another slice of the same meat was similarly freeze dried without such a treatment. On reconstitution after one week standing in air, the meat that had been freeze dried after the treatment with d-erythrose showed vastly better flavor retention.

EXAMPLE IV

Coffee was brewed from 35 grams of vacuum-packed Maxwell House coffee using 400 cc. of tap water in a commercial type percolator with automatic cut-off set for "medium". The coffee was brewed and divided into two equal portions. To one of these portions was added 40 mg. of d-ribose, to the other was added 40 mg. of d-arabinose. Both samples were freeze dried and stored in ambient air for thirty days. In the sample containing the d-arabinose, a substantially complete loss of fragrance occurred, while in the sample containing the d-ribose, desirable fresh aroma was retained.

It will be observed that in each of these tests, the stabilizing substance is present in the food material while in a non-aqueous environment, or in an essentially anhydrous environment.

In order to better understand the mechanism of the improvement in keeping quality and enhanced product flavor, a series of model experiments were set up designed to demonstrate the oxidation reducing value of selected monosaccharides as described in my invention.

Previous studies have shown that the principal interaction of proteins with autoxidizing lipids (fats) in non-aqueous, or anhydrous systems, was one of cross-linking. Through the use of a chemical reagent such as Sanger's 1-fluoro-2,4-dinitrobenzene and trypsin assays with hydrogen fluoride solubility tests, it has been shown that the free amino groups of purified proteins reacted with aldehyde intermediate oxidation products of a selected model fat such as methyl linoleate. During the course of this work, it was observed that the addition of certain sugars to the reaction mixture resulted in a resistance to the cross-linking effect of an autoxidizing lipid (fat).

An experiment was designed to determine the affect of different monosaccharides on the reduction in hydrolysis rate for a selected fat-protein model system.

Five gram samples of a gelatin (a purified protein) were dissolved in 100 ml. of distilled water containing 500 mg. of a test antioxident. The solutions were whipped to a stiff foam in a Sunbeam Mixmaster, and 1.0 gram of methyl linoleate (a purified model fat) was added during the whipping step. Control foams (without methyl linoleate) were prepared in a similar fashion for each test. The foams were shell-frozen and freeze dried, and then incubated for five days at 50 degrees C. before being enzymatically hydrolyzed.

Samples of defatted foams (0.5 gram) were mixed in 125 ml. Erlenmeyer flasks with 60 ml. of Sörensen's buffer (pH 7.7) containing 10 mg. of Difco brand tryspin (1:250).

Each sample was set up in duplicate with one being precipitated immediately upon mixing with 20 ml. of 20 percent trichloroacetic acid. The second flask was shaken for 24 hours at 37.5 degrees C and then washed with 5 percent trichloroacetic acid to adjust the volume of the filtrate to 100 ml.

The degree of hydrolysis was determined on the filtrates by using the standard Van Slyke method for liberation of alpha-amino nitrogen. The results obtained are set forth in Table I:

TABLE I.—EFFECT OF SUGARS ON REDUCTION IN HYDROLYSIS RATE IN METHYL LINOLEATE-GELATIN FOAMS

| Test sugar used: | Percent reduction in hydrolysis rate |
|---|---|
| No sugar added (control) | 22.0 |
| Glucose | 19.0 |
| d-Arabinose | 14.1 |
| d-Xylose | 10.5 |
| d-Ribose | 0.0 |

The four sugars tested were d-glucose arabinose, obtained by hydrolyzing gum arabic; xylose, obtained by the hydrolysis of straw; and ribose, a constituent of nucleic acid, found in yeast. The unexpected results obtained are cited in Table I.

The pentose sugar, d-ribose, completely inhibited the interaction between the protein (gelatin) and the autoxidizing fat, or lipid (methyl linoleate). The other pentoses were relatively ineffective by comparison. The glucose arabinose and xylose materials have a common feature in that in their structural formulas, the 2,3 hydroxyl groups are disposed on opposite sides of the ring, one from another, and ribose, on the other hand, has the 2,3 hydroxyl groups disposed in the cis position and also on the outer portion of the structure.

Still another set of experiments were conducted to determine the quantitative effects of selected monosaccharides or their derivatives by oxidation measurements. This was done as follows:

EXAMPLE V 10 mg. samples of the test substances were placed in standard Warburg flasks and dried in vacuo (.5 mm. of mercury) for 16 hours at room temperature over calcium chloride as a desiccant. ½ g. of methyl linoleate was added to each flask and mixed well with the sugar deposited in the bottom of the flask. The flasks were attached to manometers and allowed to equilibrate for 15 minutes at 37.5 degrees C before closing the system. An empty flask was used as a thermobarometer, air was used as the atmosphere, and Brodie's solution or mercury as the manometric fluid. Oxygen uptake was calculated using the following equation:

$$X = h \frac{Vg \frac{273}{T}}{Po}$$

where $h$ = corrected change in manometer reading in mm.
$X$ = amount of $O_2$ uptake in p.L. at S.T.P.
$Vg$ = gas space in system
$T$ = absolute temperature of the bath
$Po$ = standard pressure in mm. of manometric fluid FIGURE 1.—The influence of simple sugars on the $O_2$ uptake of methyl linoleate-hemoglobin systems

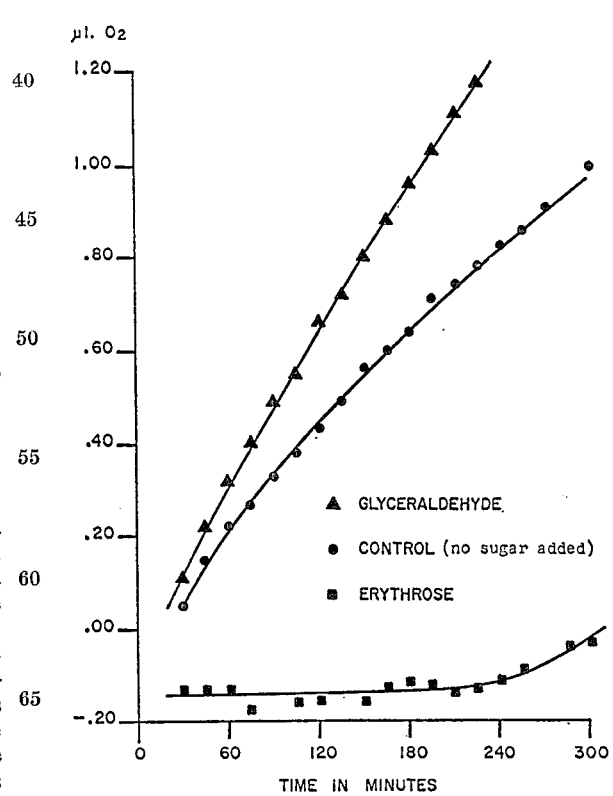

FIGURE 1 illustrates the strong inhibition achieved by the use of erythrose while glyceraldehyde and the control both oxidized rapidly.

FIGURE 2.—Influence of pentose sugars on the uptake of oxygen in methyl linoleate-hemoglobin systems

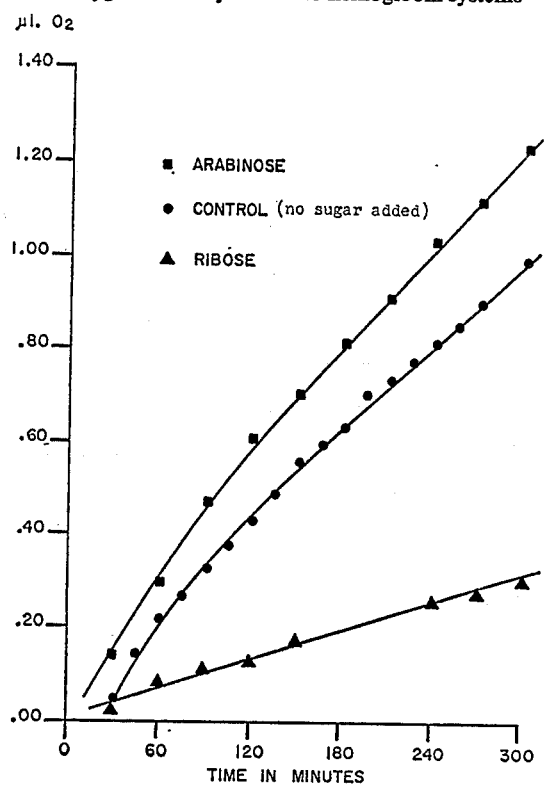

FIGURE 2 similarly shows that ribose demonstrated decided oxidation inhibition under these conditions. Arabinose, which is an isomeric sugar whose hydroxyl groups at the 2- and 3-carbon atoms are not in the cis position, on the contrary had an oxidation stimulating effect.

FIGURE 3.—Sugar antioxidants in pure methyl linoleate systems at 50° C.

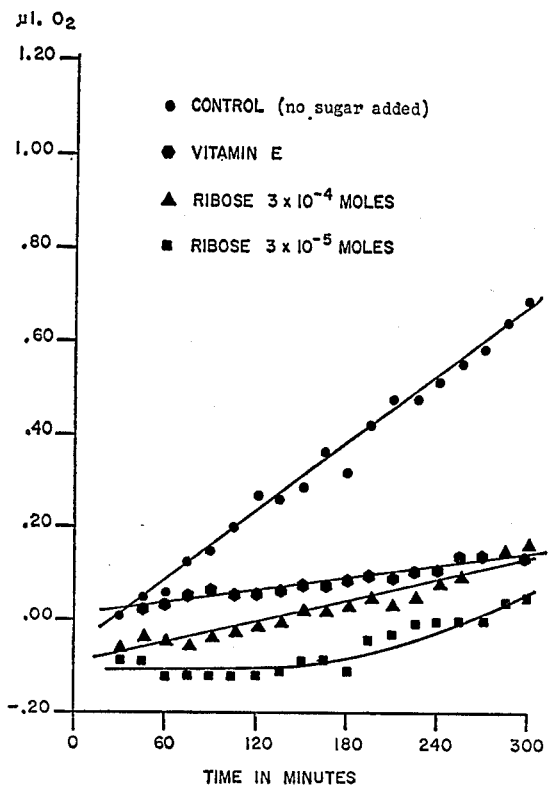

FIGURE 3 shows that the oxidation inhibition of $3 \times 10^{-4}$ and $3 \times 10^{-5}$ moles of ribose for methyl linoleate exceed that of 1.5 International Units of vitamin E under the same condition.

While the mechanism of the protective action here disclosed is indirectly relevant to the practical applications thereof, it also appeared of interest to determine whether the effect was due to oxidation of these sugars thus competing for the oxygen or to some other mechanism. If a competition for the oxygen were taking place, there would not have been a reduction in the oxygen uptake in the Warburg manometric apparatus. As an additional determination, a chromatographic search for ribitol was made which would have been the product of reduction of ribose. No indication of ribitol being present was found, although in controls to which ribitol had been deliberately added this was detected readily by chromatography.

Since direct oxidation or reduction of the added carbohydrate ingredient does not appear to apply, the effect may be due either to some form of negative catalysis, or possibly to a surface effect based on orientation in a boundary layer film in such a fashion that the sugar molecule lies on its side with the hydroxyl groups sticking out. This may account for the superiority of those substances such as erythrose, ribose and allose, which have their hydroxyl groups in the cis position on the 2, 3 carbons disposed outwardly of the ring structure. This also includes such substances as 1-lyxose; 6-deoxy-d-gulose; 6-deoxy-d-allose, and 1-talose.

While reference has been made to the sugars themselves, it is realized that some similar beneficial effects may be expected from derivatives which form these sugars by hydrolysis, such as their esters, and particularly from such derivatives as leave undisturbed the principally active antioxidant grouping consisting of an aldehyde or alcohol group, at the end of the molecule, with hydroxyls in cis position at the 2- and 3-carbon atoms. While reference has been made to certain specific food materials, it is realized that this invention is applicable to the full range of foods, cosmetics and pharmaceuticals in so-called non-aqueous or essentially anhydrous systems, wherever substances are readily oxidized.

It will be appreciated that those specific examples given herein are provided for purposes of illustration only, and are not intended to be used in a limiting sense, since those skilled in the art may depart from those specific examples without departing from the spirit and scope of the present invention.

What is claimed is:

1. The method of stabilizing essentially anhydrous food materials intended for human consumption against oxidation, which comprises preparing an admixture of said food material with at least 0.0005 percent by weight on a dry basis of a monosaccharide added to said food material, the monosaccharide being selected from the group consisting of furanose and pyranose and being characterized in that the hydroxyl groups disposed at the number 2 and 3 position carbon atoms following the carbonyl group is disposed in the cis position and outwardly of the monosaccharide ring structure.

2. The method as set forth in claim 1 being particularly characterized in that monosaccharide has a carbon chain containing from between 4 and 6 carbon atoms therein.

3. The method as set forth in claim 1 being particularly characterized in that said monosaccharide is a pyranose form of monosaccharide selected from the group consisting of d-ribose, and d-allose.

4. The method as set forth in claim 1 being particularly characterized in that said monosaccharide is a form of monosaccharide selected from the group consisting of d-erythrose and 1-talose.

5. A composition intended for consumption, comprising an essentially anhydrous substance susceptible to oxidation, stabilized by the addition thereto of at least 0.0005 percent of a monosaccharide having the structural formula CHO—CHOH—CHOH—R wherein R represents a radical consisting of a combination of carbon, hydrogen, and oxygen to complete a monosaccharide type structure, said monosaccharide compound being particularly characterized in that the specific hydroxyl groups disposed on the carbon atoms in the number 2 and 3 positions following the carbonyl group are in cis relationship and outwardly of the monosaccharide ring structure.

6. The material as defined in claim 5 being particularly characterized in that said compound is the monosaccharide d-ribose.

7. The material as defined in claim 5 being particularly characterized in that said compound is the monosaccharide d-erythrose.

8. The method of stabilizing a meat product intended for human consumption which comprises substantially dehydrating the meat product in the presence of a monosaccharide having from between 4 and 6 carbon atoms, and having the hydroxyl groups of the number 2, 3 position carbon atoms in the cis position, one with respect to the other, both cis hydroxyl groups being disposed outwardly of the monosaccharide ring structure.

9. The method of stabilizing non-aqueous fruit flavor extracts which comprises adding in excess of about 0.001 percent of a monosaccharide having from between 4 and 6 carbon atoms, and having the hydroxyl groups of the 2, 3 carbon atoms in the cis position, one with respect to the other, both of said cis hydroxyl groups being disposed outwardly of the monosaccharide ring structure.

References Cited

UNITED STATES PATENTS

| | | | |
|---|---|---|---|
| 2,063,602 | 12/1936 | Hunt et al. | 99—163 X |
| 2,152,602 | 3/1939 | Ott | 99—150 |
| 2,176,034 | 10/1939 | Musher | 99—150 |
| 2,400,748 | 5/1946 | Flosdorf | 99—208 X |
| 2,447,427 | 8/1948 | Oftedahl | 99—157 X |
| 2,952,552 | 9/1960 | Ansel | 99—208 |
| 2,985,664 | 5/1961 | Krebs et al. | 99—150 X |

FOREIGN PATENTS 13,725   12/1962   Japan.

OTHER REFERENCES

"Food Chemistry," by L. H. Meyer, 1960, Reinhold Publ. Co., N.Y., pp. 144 and 145.

MAURICE W. GREENSTEIN, *Primary Examiner.*

U.S. Cl. X.R.

99—157, 163, 208, 155, 206; 252—407; 260—398.5